US012046835B2

(12) United States Patent
Son

(10) Patent No.: US 12,046,835 B2
(45) Date of Patent: Jul. 23, 2024

(54) ELECTRONIC DEVICE INCLUDING ANTENNA MODULE AND METHOD OF OPERATING THE SAME

(71) Applicant: SAMSUNG ELECTRONICS CO., LTD., Suwon-si (KR)

(72) Inventor: Jongkuck Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 17/667,007

(22) Filed: Feb. 8, 2022

(65) Prior Publication Data

US 2022/0255228 A1 Aug. 11, 2022

Related U.S. Application Data

(63) Continuation of application No. PCT/KR2022/001854, filed on Feb. 7, 2022.

(30) Foreign Application Priority Data

Feb. 9, 2021 (KR) ........................ 10-2021-0018587

(51) Int. Cl.

*H01Q 5/371* (2015.01)
*H01Q 1/00* (2006.01)
*H01Q 21/28* (2006.01)

(52) U.S. Cl.

CPC ............. *H01Q 5/371* (2015.01); *H01Q 1/002* (2013.01); *H01Q 21/28* (2013.01)

(58) Field of Classification Search

CPC ............ H01Q 1/243; H01Q 1/48; H01Q 9/42; H01Q 1/00; H01Q 1/002; H01Q 1/22; H01Q 1/2283; H01Q 1/36; H01Q 1/38; H01Q 1/44; H01Q 1/52; H01Q 13/10; H01Q 13/106; H01Q 21/005;

(Continued)

(56) References Cited

U.S. PATENT DOCUMENTS 10,312,973 B1 * 6/2019 Luo .......................... H04B 7/08
2011/0275333 A1 11/2011 Kim et al.

(Continued)

FOREIGN PATENT DOCUMENTS

JP 2002-148367 A 5/2002
JP 2014-057165 A 3/2014

(Continued)

OTHER PUBLICATIONS

International Search Report dated May 16, 2022 for PCT/KR2022/001854.

(Continued)

*Primary Examiner* — Monica C King
(74) *Attorney, Agent, or Firm* — NIXON & VANDERHYE P.C.

(57) ABSTRACT

According to an embodiment of the disclosure, an electronic device may include: a printed circuit board (PCB); a plurality of lines disposed on the PCB; a plurality of conductive pads disposed at an upper surface of the PCB on which the plurality of lines are disposed; a first antenna pattern disposed at the upper surface of the PCB and electrically connected to a first conductive pad of the plurality of conductive pads; and a first switch electrically connected to the first antenna pattern.

19 Claims, 19 Drawing Sheets

(58) Field of Classification Search
CPC .. H01Q 21/0087; H01Q 21/065; H01Q 21/28; H01Q 21/30; H01Q 23/00; H01Q 25/005; H01Q 25/04; H01Q 5/378; H01Q 7/00; H01Q 9/0407; A44C 5/14
See application file for complete search history.

(56) References Cited

U.S. PATENT DOCUMENTS

| | | | | |
|---|---|---|---|---|
| 2014/0362544 | A1* | 12/2014 | Han | G04G 21/04 361/748 |
| 2016/0072178 | A1* | 3/2016 | Khalifa | H01Q 1/36 343/702 |
| 2016/0329629 | A1* | 11/2016 | Park | H01Q 21/30 |
| 2018/0129170 | A1 | 5/2018 | Yun et al. | |
| 2019/0103680 | A1* | 4/2019 | Liao | H01Q 21/065 |
| 2020/0321686 | A1 | 10/2020 | Kim et al. | |
| 2020/0350390 | A1* | 11/2020 | Kim | H10K 50/844 |
| 2020/0350669 | A1* | 11/2020 | Seo | H01Q 1/002 |
| 2021/0036424 | A1* | 2/2021 | Eslami | H04L 1/0072 |
| 2021/0226326 | A1 | 7/2021 | Kim et al. | |

FOREIGN PATENT DOCUMENTS

| | | | |
|---|---|---|---|
| KR | 10-2011-0123995 | A | 11/2011 |
| KR | 10-2018-0050151 | | 5/2018 |
| KR | 10-2019-0091077 | | 8/2019 |
| KR | 10-2019-0138359 | A | 12/2019 |
| KR | 10-2020-0105140 | A | 9/2020 |
| WO | WO 2022/173179 | A1 | 8/2022 |

OTHER PUBLICATIONS

Notification of Publication of International Application for PCT/KR2022/001854.
PCT Written Opinion dated May 16, 2022 for PCT/KR/2022/001854.

* cited by examiner (Upper surface)

(Side surface)

ELECTRONIC DEVICE INCLUDING ANTENNA MODULE AND METHOD OF OPERATING THE SAME

CROSS-REFERENCE TO RELATED APPLICATIONS

This application is a continuation of International Application No. PCT/KR2022/001854 designating the United States, filed on Feb. 7, 2022, in the Korean Intellectual Property Receiving Office and claiming priority to Korean Patent Application No. 10-2021-0018587, filed on Feb. 9, 2021, in the Korean Intellectual Property Office, the disclosures of which are incorporated by reference herein in their entireties.

BACKGROUND

Field

The disclosure relates to an electronic device, and for example, to an electronic device including an antenna module and a method of operating the same.

Description of Related Art

Recent portable electronic devices may have various forms such as smart phones and wearable devices. A size of the wearable device may be smaller than that of the smart phone in consideration of portability.

With the development of electronic devices and communication technologies, the use of communication systems supporting various frequency bands is being considered. In order to support various frequency bands, the electronic device may include a plurality of antennas.

According to a size of an electronic device, a space and/or structure for disposing an additional antenna may be limited.

SUMMARY

Embodiments of the disclosure may utilize a component included in the electronic device as at least a portion of an antenna structure to efficiently utilize a space and/or structure of the electronic device.

According to various example embodiments, an electronic device may include: a printed circuit board (PCB); a plurality of lines disposed on the PCB; a plurality of conductive pads disposed at an upper surface of the PCB on which the plurality of lines are disposed; a first antenna pattern disposed at the upper surface of the PCB and electrically connected to a first conductive pad of the plurality of conductive pads; and a first switch electrically connected to the first antenna pattern.

According to various example embodiments, an electronic device may include: a front case; a rear case coupled to the front case; and a waterproof stopper coupling part, and a waterproof stopper coupled to the waterproof stopper coupling part.

Various example embodiments of the disclosure can provide an antenna pattern structure using a line that provides a logic function used upon producing and/or developing an electronic device.

Various example embodiments of the disclosure can provide an antenna pattern structure utilizing a PCB area used upon producing and/or developing an electronic device.

Various example embodiments of the disclosure can provide an antenna pattern capable of improving a broadband performance using a waterproof stopper of a rear case of an electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
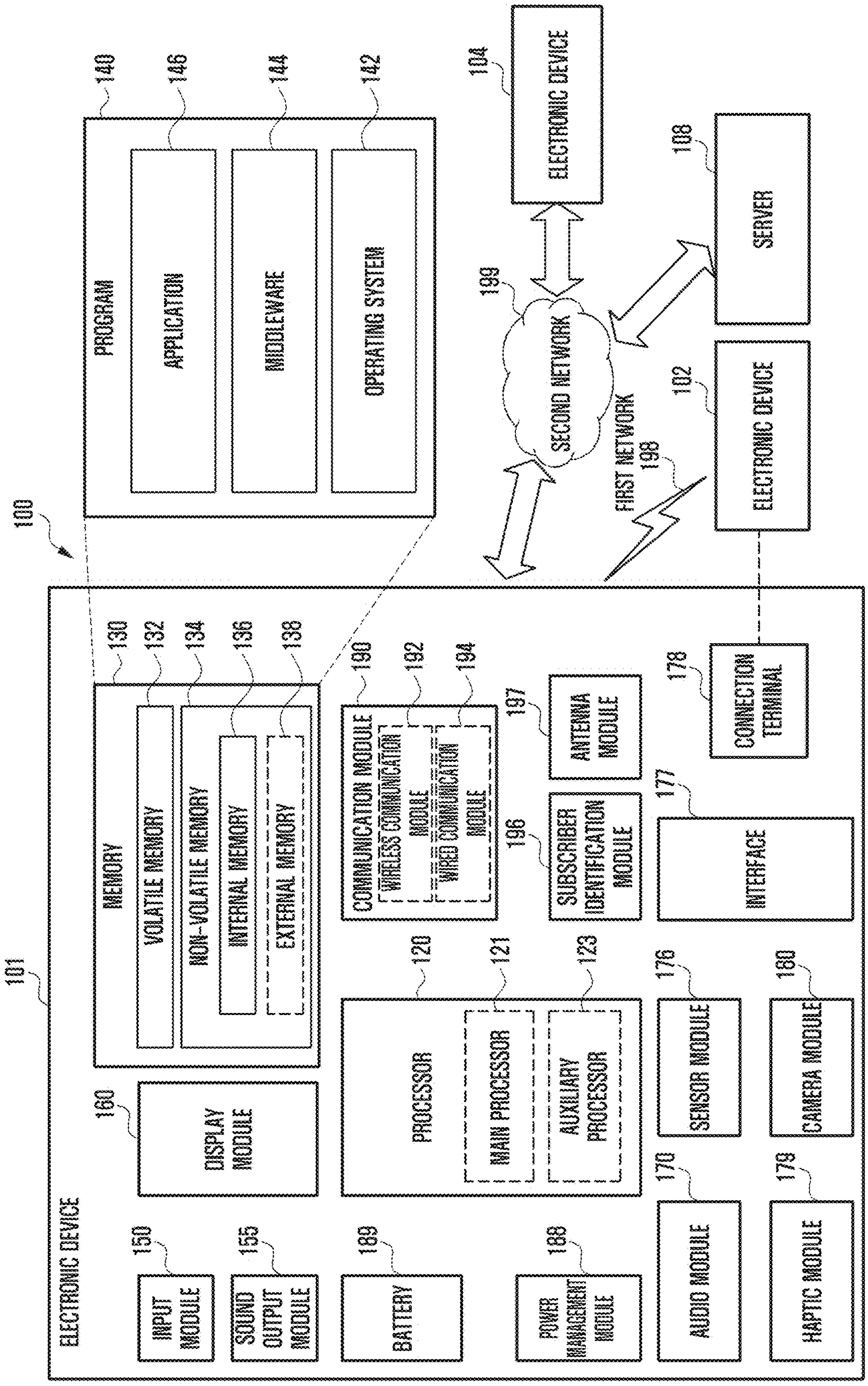
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
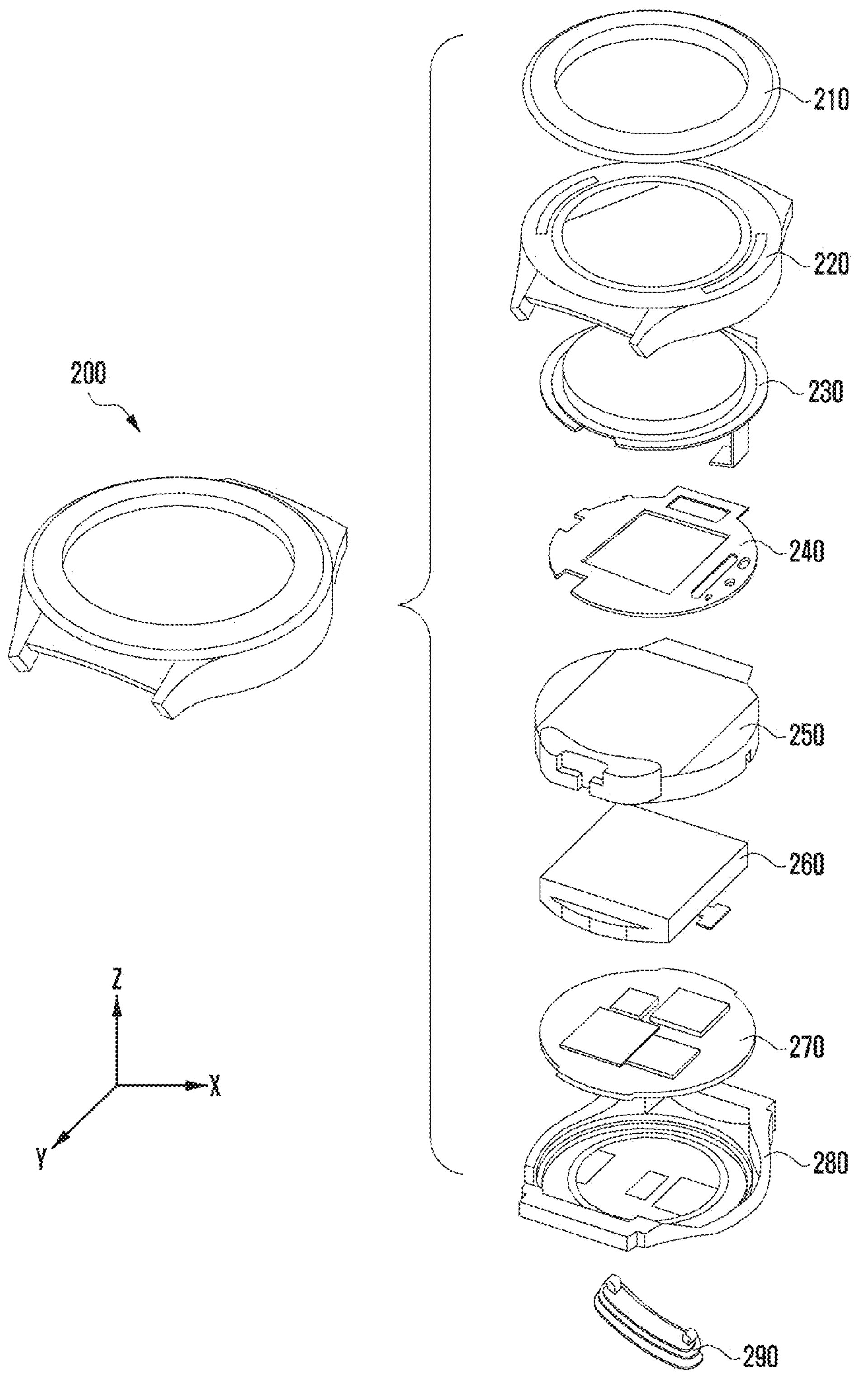
FIG. 2 is an exploded perspective view of an electronic device according to various embodiments.

FIG. 2 is an exploded perspective view of an electronic device according to various embodiments.

With reference to FIG. 2, an electronic device 200 may include a wheel 210, a front case 220, a display 230, a steel use stainless (SUS) plate 240, a bracket 250, a battery 260, a main printed circuit board (PCB) 270, a rear case 280, and a waterproof stopper 290. Here, the electronic device 200 may be the same as or similar to the electronic device 101 of FIG. 1.

The wheel 210 may be disposed at the upper end of the front case 220. For example, the wheel 210 may be stacked at the upper end of the front case 220. The front case 220 may be comprise a metal or a non-metal material.

The front case 220 may be disposed at the upper end of the display 230. For example, the front case 220 may be stacked at the upper end of the display 230. A partial area of the display 230 may be exposed to the outside through an opening formed in the front case 220. At least a portion of the front case 220 according to an embodiment of the disclosure may be included in an antenna operating in a frequency band for at least one of 3rd generation (3G), long term evolution (LTE), and/or global positioning system (GPS). For example, at least a portion of the front case 220 may comprise a conductive metal material of at least a portion of the antenna.

The display 230 may be disposed at the upper end of the SUS plate 240. For example, the display 230 may be stacked at the upper end of the SUS plate 240.

The SUS plate 240 may be disposed at the upper end of the bracket 250. For example, the SUS plate 240 may be stacked at the upper end of the bracket 250.

The bracket 250 may be disposed at the upper end of the battery 260. For example, the bracket 250 may be stacked at the upper end of the battery 260. At least a portion of the bracket 250 according to an embodiment of the disclosure may be included in an antenna operating in a frequency band for at least one of wireless communication (e.g., Bluetooth, Wi-Fi). For example, the bracket 250 may include at least a portion of a laser direct structuring (LDS) pattern antenna.

The battery 260 may be disposed at the upper end of the main PCB 270. For example, the battery 260 may be stacked at the upper end of the main PCB 270.

The main PCB 270 may be disposed at the upper end of the rear case 280. For example, the main PCB 270 may be stacked at the upper end of the rear case 280.

The rear case 280 may be coupled to the front case 220. For example, the display 230, the SUS plate 240, the bracket 250, the battery 260, and the main PCB 270 may be disposed in an inner space of the front case 220 and the rear case 280. At least a portion of the rear case 280 according to an embodiment of the disclosure may be included in an antenna operating in a frequency band for at least one of 3G, LTE, and/or GPS. In order to avoid interference with the front case 220, a material of the rear case 280 may be different from that of the front case 220. The material of the rear case 280 may be formed with, for example, coated or colored glass, ceramic, polymer, metal (e.g., aluminum, stainless steel (STS), or magnesium), or a combination of at least two of the above materials.

The waterproof stopper 290 may be disposed at the lower end of the rear case 280. For example, the waterproof stopper 290 may be coupled to an opening (not illustrated) of the rear case 280 to prevent and/or reduce moisture from penetrating into the electronic device 200. A top view of the main PCB 270 according to an embodiment may be the same as that of FIG. 3.

Figure 3:
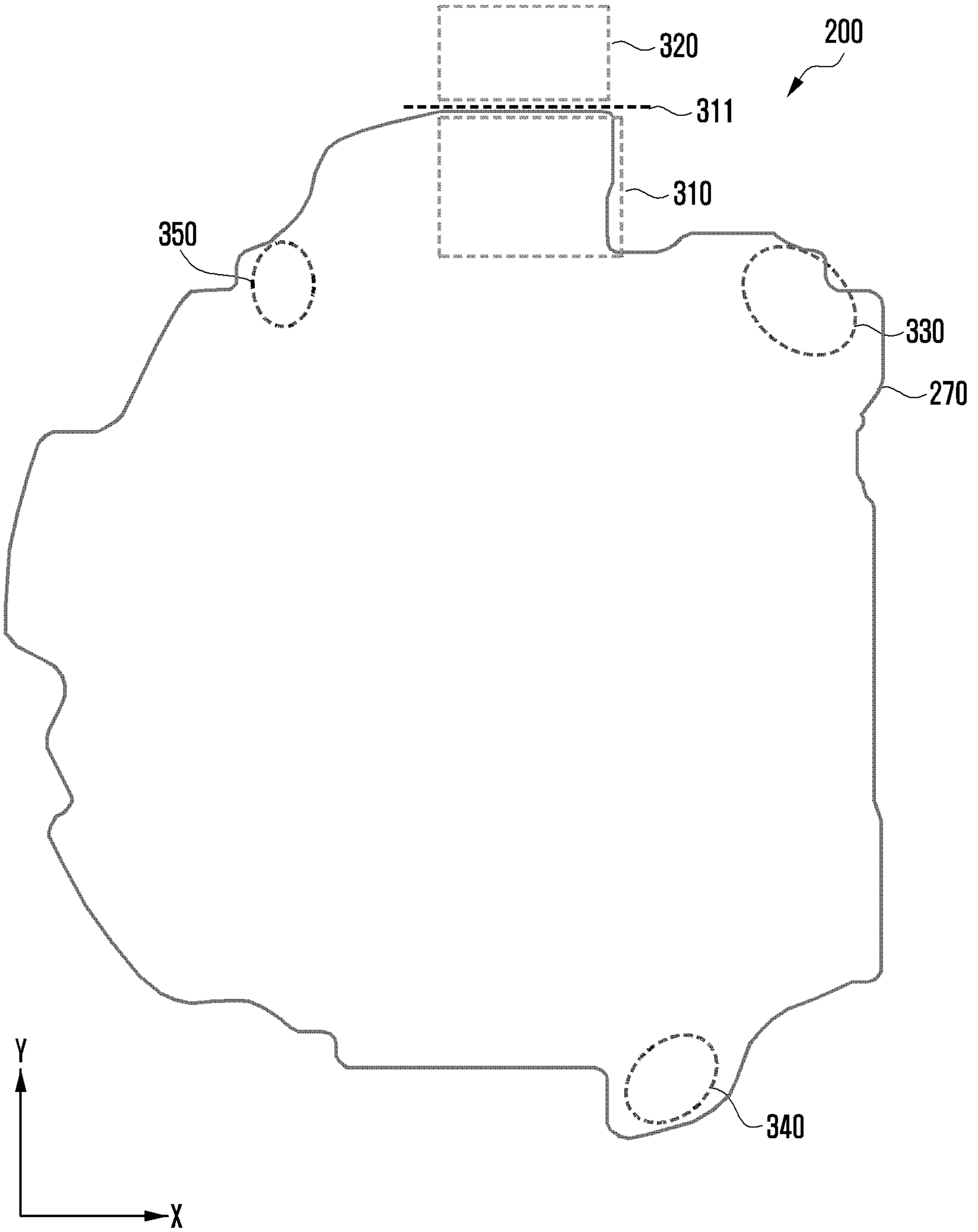
FIG. 3 is a diagram illustrating an upper surface of a main PCB of an electronic device according to various embodiments.

FIG. 3 is a diagram illustrating an upper surface of a main PCB of an electronic device according to various embodiments.

With reference to FIG. 3, the main PCB 270 of the electronic device 200 may include a first area 310, a second area 320, a third area 330, a fourth area 340 and a fifth area 350.

The first area 310 may be an area in which a plurality of conductive pads for testing the main PCB 270 are disposed. The plurality of conductive pads may be pads in contact with a POGO pin for testing the main PCB 270. The conductive pad area 310 may be referred to as a fill-cut area.

The second area 320 may be an area in which an external PCB line is disposed. The second area 320 may be connected to the first area 310. The second area 320 may be separated from the main PCB 270 using a main PCB side surface 311 as a boundary according to a cutting process. For example, the second area 320 may be separated from the first area 310 using the main PCB side surface 311 as a boundary after the surface mount of the main PCB 270 is completed.

The second area 320 may be an area in which a PCB line connected to an external jig circuit (not illustrated) of the main PCB 270 is disposed. For example, the PCB line may be a PCB line used for a printed board assembly (PBA) process.

The third area 330 may be an area in which a circuit for supplying an electrical signal to an antenna for first communication (e.g., long-distance communication, cellular communication) is disposed. The first communication antenna may use at least a portion of the front case 220 and/or at least a portion of the bracket 250 of FIG. 2 or may be formed or included in at least a portion of the front case 220 and/or at least a portion of the bracket 250.

The fourth area 340 may be an area in which a circuit for electrically shorting the first communication antenna is disposed.

The fifth area 350 may be an area in which a circuit for supplying an electrical signal to an antenna for second communication (e.g., short-range communication) is disposed. For example, at least a portion of the second communication antenna may include at least a portion of the rear case 280 of FIG. 2.

Figure 4:
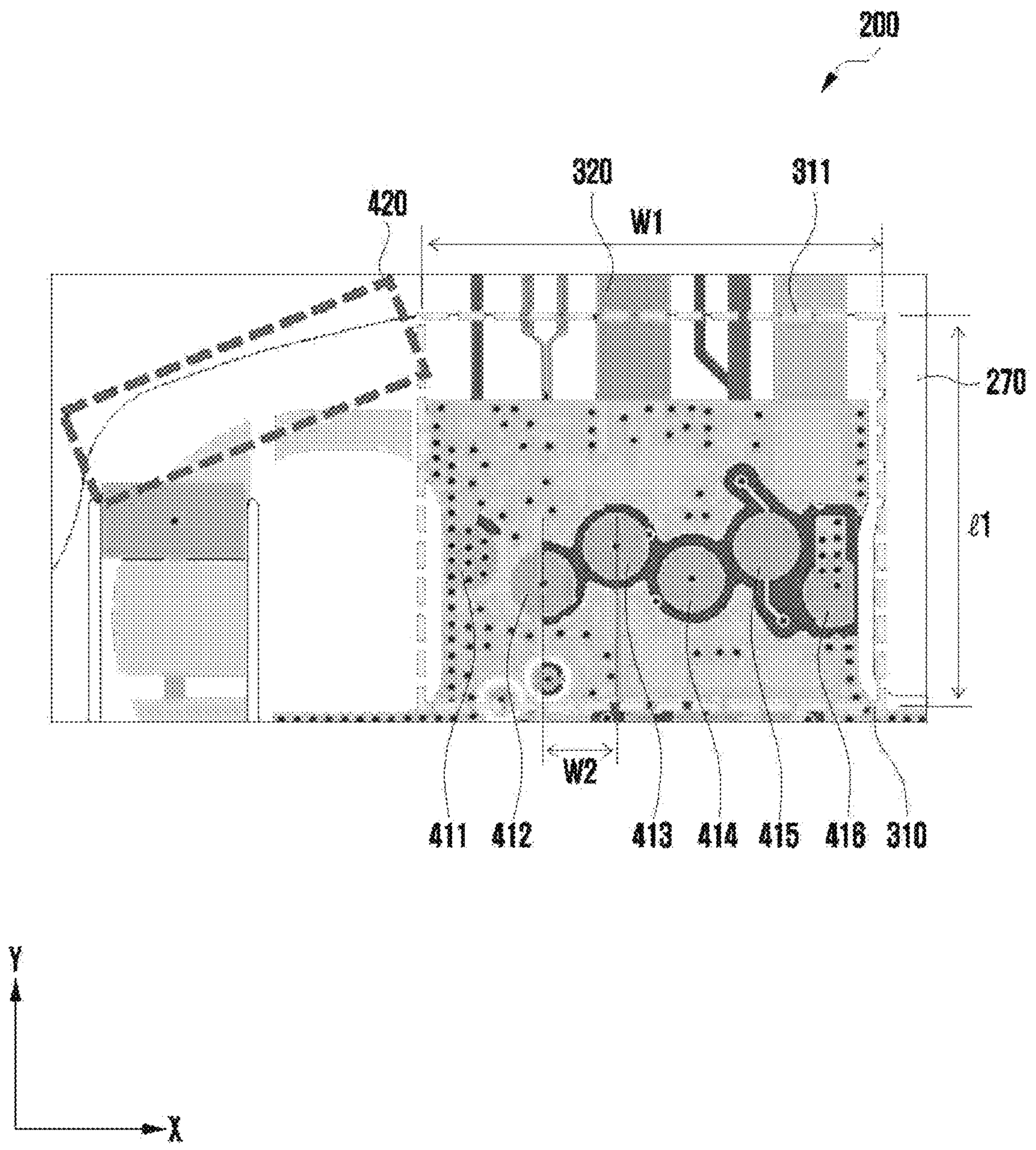
FIG. 4 is a diagram illustrating an upper surface of a main PCB including a first area of an electronic device according to various embodiments.

When the first area 310 according to an embodiment is enlarged, it may be the same as or similar to that illustrated in FIG. 4.

FIG. 4 is a diagram illustrating an upper surface of a main PCB including a first area of an electronic device according to various embodiments.

With reference to FIG. 4, at an upper surface of the first area 310 of the main PCB 270 of the electronic device 200, a plurality of conductive pads 411, 412, 413, 414, 415 and 416 (which may be referred to hereinafter as conductive pads 411 to 416) may be disposed. For example, the plurality of conductive pads 411 to 416 may have a shape engraved in or protruding from the main PCB 270. FIG. 4 illustrates each of the plurality of conductive pads 411 to 416 in a circular shape as an embodiment, but a shape of each of the plurality of conductive pads 411 to 416 may not be limited. For example, each of the plurality of conductive pads 411 to 416 may have various shapes such as a quadrangle. FIG. 4 illustrates six conductive pads 411 to 416 as an embodiment, but the number of conductive pads may not be limited.

A horizontal length w1 of the first area 310 may be in a range of about 2 mm to 6 mm. A vertical length 11 of the first area 310 may be in a range of about 2 mm to 6 mm. A gap w2 between respective center points of the plurality of conductive pads 411 to 416 may be in a range of about 1 mm. At least one antenna pattern may be disposed in the first area 310 according to various embodiments.

A fill-cut area 420 may be positioned in an area adjacent to one side surface of the conductive pad area 310. The fill-cut area 420 may be an area in which a conductive pattern does not exist. At least one antenna pattern may be disposed adjacent to the fill-cut area 420 according to various embodiments.

Figure 5:
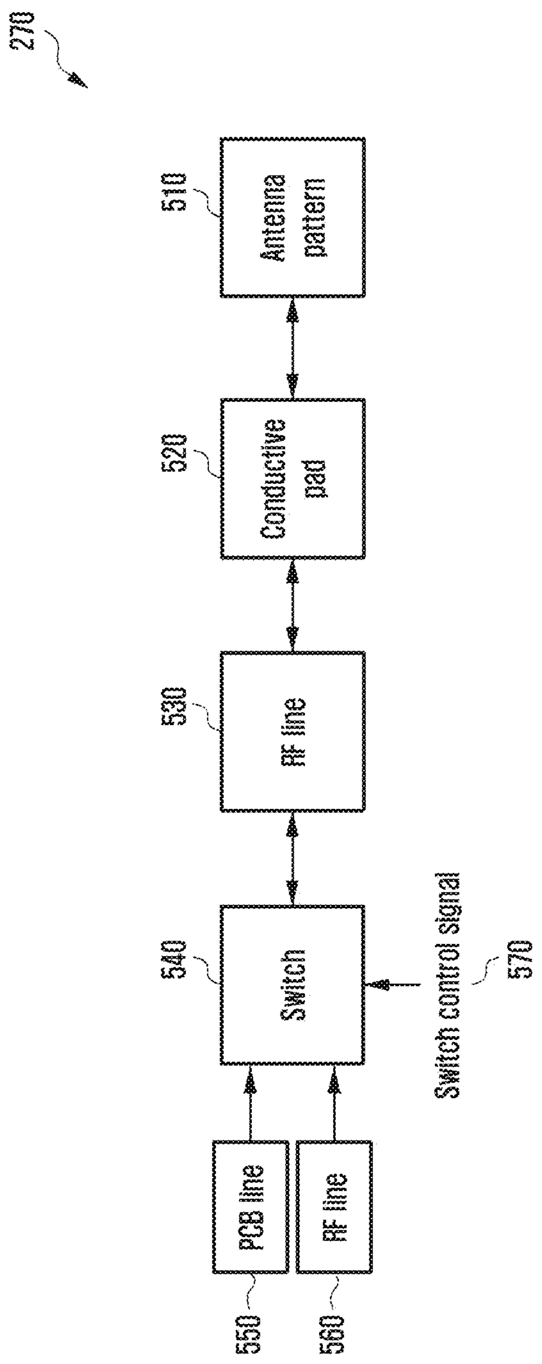
FIG. 5 is a block diagram illustrating an example configuration of a main PCB including a first area of an electronic device according to various embodiments.

The main PCB 270 including the first area 310 according to an embodiment may have the same or similar block configuration as that illustrated in FIG. 5.

FIG. 5 is a block diagram illustrating an example configuration of a main PCB including a first area of an electronic device according to various embodiments.

With reference to FIG. 5, the main PCB 270 may include an antenna pattern 510, a conductive pad 520, an RF line 530, a switch 540, a PCB line 550, and an RF line 560. According to various embodiments, the antenna pattern 510, the conductive pad 520, and the RF line 530 may be configured as one conductive pattern. One conductive pattern according to various embodiments may be configured with the antenna pattern 510 and the RF line 530, except for the conductive pad 520. According to an embodiment, the RF line 530 may include a separate line for applying power.

One end of the antenna pattern 510 may be electrically connected to one end of the conductive pad 520. The other end of the conductive pad 520 may be electrically connected to one end of the RF line 530. The other end of the RF line 530 may be electrically connected to a first port of the switch 540. One end of the PCB line 550 may be electrically connected to a second port of the switch 540. One end of the RF line 560 may be electrically connected to a third port of the switch 540.

The antenna pattern 510 according to various embodiments may be designed by adjusting a width and length of the line. For example, a structure of the antenna pattern 510 may be determined according to a used frequency band. The antenna pattern 510 may be plural. The structure of the antenna pattern 510 may be determined based on an operating resonant frequency. For example, the antenna pattern 510 may be designed as a dipole antenna or a planer inverted f antenna (PIFA)/inverted f antenna (IFA) antenna.

The switch 540 may receive a switch control signal 570 through a fourth port. For example, the switch control signal 570 may be at least one of a V_BUS signal, a V_BATT signal, and an antenna control signal. For example, the antenna control signal may be a signal for indicating at least one antenna to be operated among the plurality of antennas.

The switch 540 may be selectively connected to one of the PCB line 550 or the RF line 560. For example, the switch 540 may not be connected to the PCB line 550 in a normal mode. For example, the switch 540 may be connected to the RF line 560 in a normal mode. For example, an operation of the electronic device 200 using the switch 540 may be the same as or similar to that illustrated in FIG. 6.

An example configuration of the antenna pattern 510, the conductive pad 520, the RF line 530, the switch 540, the PCB line 550, and the RF line 560 on the main PCB 270 will be described in greater detail below with reference to FIGS. 7, 8, 9 and 10.

Figure 6:
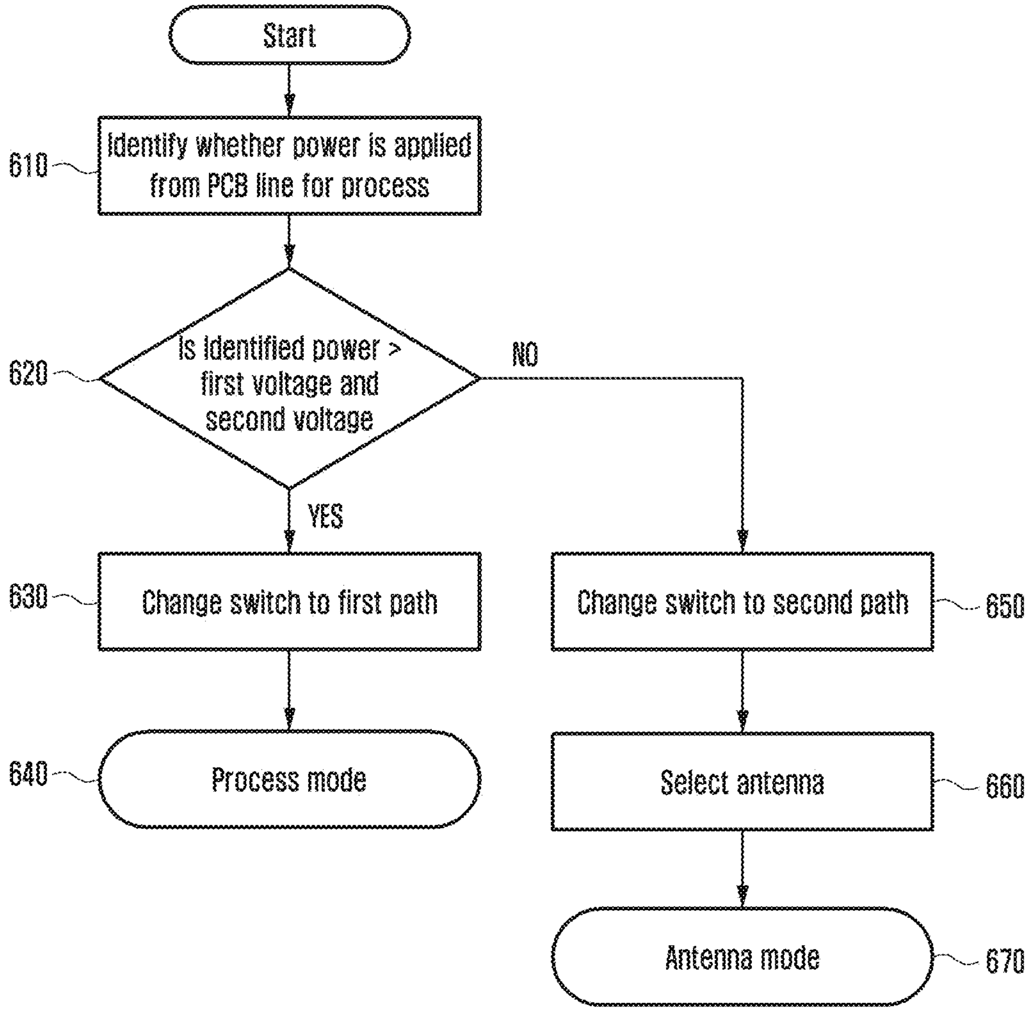
FIG. 6 is a flowchart illustrating an example operation of an electronic device according to various embodiments.

FIG. 6 is a flowchart illustrating an example operation of an electronic device 200 according to various embodiments.

With reference to FIG. 6, a processor of the electronic device 200 may identify whether power is applied from an external PCB line 320 for a process (operation 610).

According to an embodiment, the processor of the electronic device 200 may identify power input to the antenna RF line 530 or the conductive pad 520 (operation 620). The processor of the electronic device 200 may identify power applied from the external PCB line 320 for a process (operation 620). For example, when first power is applied from the external PCB line 320, the electronic device 200 may determine whether the intensity of the first power exceeds a first voltage (or first power). For example, the first power may be battery power.

According to an embodiment, when the intensity of the first power applied from the external PCB line 320 is less than the first voltage, the processor of the electronic device 200 may determine whether a voltage of second power applied from the external PCB line 320 exceeds a second voltage (or second power). For example, the second power may be USB power. For example, the second voltage may be configured to a value greater than that of the first voltage. For example, the first voltage may be 3.5V, and the second voltage may be 4.5V.

According to an embodiment, when the first power applied from the external PCB line 320 exceeds the first voltage or when the second power applied from the external PCB line 320 exceeds the second voltage, the processor of the electronic device 200 may change the switch 540 to a first path (operation 630).

According to an embodiment, when the first power applied from the external PCB line 320 exceeds the first voltage, the processor of the electronic device 200 may control to electrically connect the switch 540 to the PCB line 550. When the second power applied from the external PCB line 320 exceeds the second voltage, the processor of the electronic device 200 may control to electrically connect the switch 540 to the PCB line 550.

According to an embodiment, the electronic device 200 may change the switch 540 to the first path to operate in a process mode (operation 640). According to an embodiment, when the external power exceeds a specified criterion, the electronic device 200 may change the switch 540 to the first path to operate in the first mode (e.g., process mode) (operation 640).

According to an embodiment, when the first power or the second power applied from the external PCB line 320 is less than the first voltage or the second voltage or when no power is applied, the processor of the electronic device 200 may change the switch 540 to a second path (operation 650). For example, when the second power applied from the external PCB line 320 is less than the second voltage, the processor of the electronic device 200 may control the switch 540 to be electrically connected to the RF line 560.

According to an embodiment, the electronic device 200 may change the RF switch 540 to the second path and then select an antenna (operation 660).

According to an embodiment, after changing the switch 540 to the second path, the processor of the electronic device 200 may operate in an antenna mode using the RF line 530 and/or the antenna pattern 510 (operation 670). The processor of the electronic device 200 may default the path of the switch 540 as the second path. For example, the operation mode of the electronic device 200 may be defaulted to the antenna mode. The processor of the electronic device 200 may operate in the antenna mode in a state in which external power is not applied.

Figure 7:
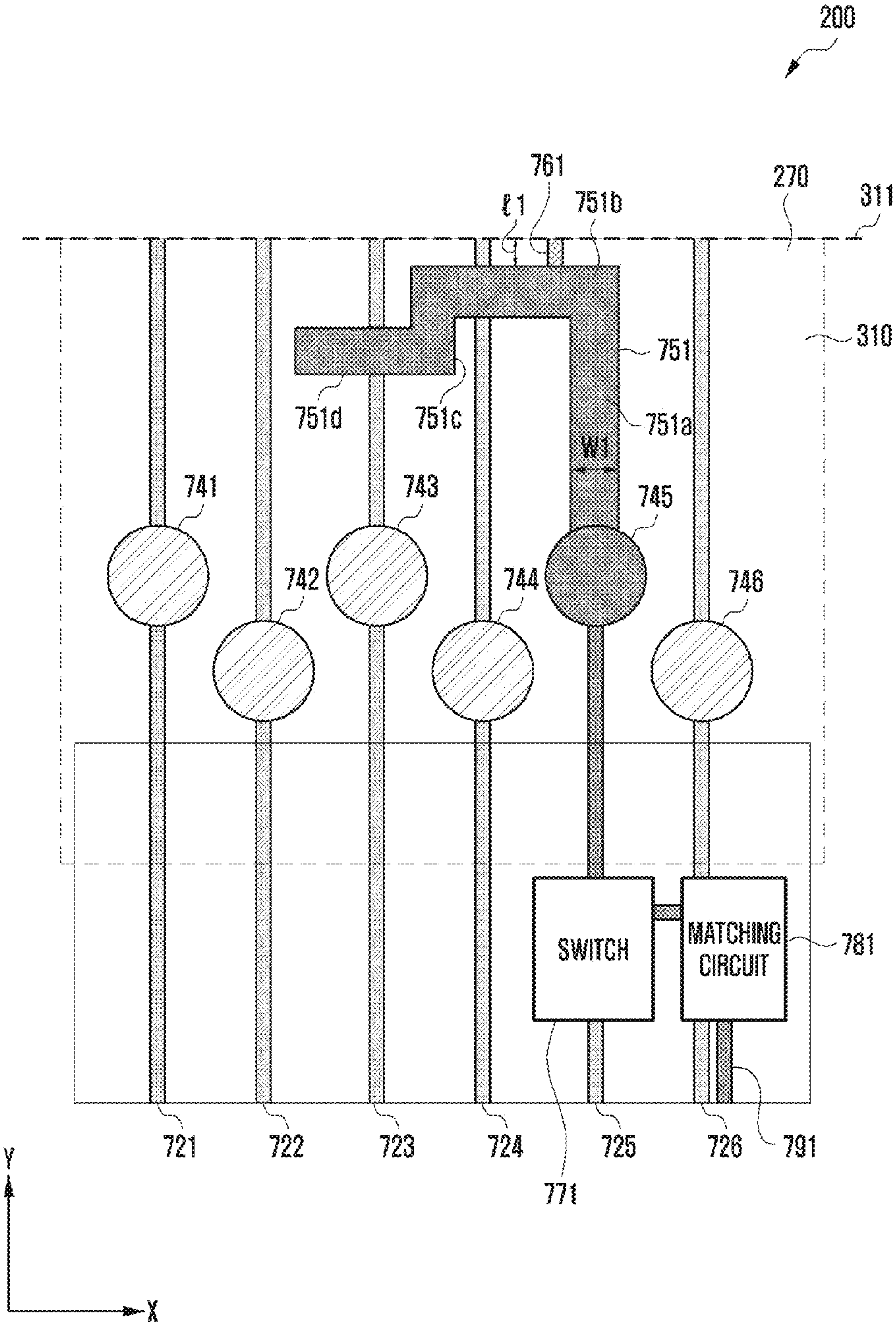
FIG. 7 is a diagram illustrating an upper surface of a main PCB of an electronic device according to various embodiments.

FIG. 7 is a diagram illustrating an upper surface of a main PCB of an electronic device according to various embodiments.

With reference to FIG. 7, the main PCB 270 of the electronic device 200 may include a plurality of PCB lines 721, 722, 723, 724, 725 and 726 (which may be referred to herein as PCB lines 721 to 726), a plurality of conductive pads 741, 742, 743, 744, 745 and 746 (which may be referred to herein as pads 741 to 746), a first antenna pattern 751, a first branch line 761, a first switch 771, and a first antenna matching circuit 781. An area in which the plurality of conductive pads 741 to 746, the first antenna pattern 751, and the first branch line 761 are disposed in the main PCB 270 may be a first area 310. For example, the first area 310 may be referred to as a peel-cut area.

For example, the first antenna pattern 751 and the first branch line 761 may be the same as or similar to the antenna pattern 510 of FIG. 5. The antenna pattern 510 of FIG. 5 may include a first antenna pattern 751 and a first branch line 761. The plurality of conductive pads 741 to 746 may be the same as or similar to the conductive pad 520 of FIG. 5. The conductive pad 520 of FIG. 5 may include a plurality of conductive pads 741 to 746. The first switch 771 may be the same as or similar to the switch 540 of FIG. 5. The switch 540 of FIG. 5 may include a first switch 771. At least one of the plurality of PCB lines 721 to 726 may be the same as or similar to the PCB line 550 of FIG. 5. The PCB line 550 of FIG. 5 may include at least one of the plurality of PCB lines 721 to 726. At least one of the plurality of PCB lines 721 to 726 may be the same as or similar to the RF line 560 of FIG. 5. The RF line 560 of FIG. 5 may include at least one of the plurality of PCB lines 721 to 726.

The plurality of PCB lines 721 to 726 may be disposed on the main PCB 270.

The plurality of conductive pads 741 to 741 may be disposed on the main PCB 270. Each of the plurality of conductive pads 741 to 746 may be electrically connected to a corresponding line of the plurality of PCB lines 721 to 726. For example, the first conductive pad 741 may be electrically connected to the first PCB line 721. The second conductive pad 742 may be electrically connected to the second PCB line 722. The third conductive pad 743 may be electrically connected to the third PCB line 723. The fourth conductive pad 744 may be electrically connected to the fourth PCB line 724. The fifth conductive pad 745 may be electrically connected to the fifth PCB line 725. The sixth conductive pad 746 may be electrically connected to the sixth PCB line 726.

The first antenna pattern 751 may be disposed on the main PCB 270. For example, the first antenna pattern 751 may be disposed at the upper surface of the main PCB 270. One end of the first antenna pattern 751 may be electrically connected to one end of the fifth conductive pad 745. A width w1 of the first antenna pattern 751 may have various ranges. For example, the width w1 of the first antenna pattern 751 may be in a range of about 0.5 mm to 1.0 mm.

The first antenna pattern 751 may be electrically connected to the first branch line 761. For example, one end of the first branch line 761 may be electrically connected to an arbitrary point of the first antenna pattern 751. The arbitrary point may be a point having a low current distribution in the first antenna pattern 751 and having a low influence on antenna performance when the first antenna pattern 751 operates as an antenna. For example, in order to minimize and/or reduce a cutting deviation of the PCB side surface 311, the first branch line 761 may be designed to branch from a point in which a current distribution is the lowest in the first antenna pattern 751 to a smallest line width. The first branch line 761 may be designed to minimize and/or reduce a fluctuation range of a resonant frequency of the first antenna pattern 751.

A length 11 of the first branch line 761 may have various values. For example, the length 11 of the first branch line 761 may be about 0.2 mm. The length 11 of the first branch line 761 may be determined based on a length in consideration of a routing error and a length in consideration of an additional margin. For example, the length 11 of the first branch line 761 may be determined based on a length of 0.1 mm in consideration of a routing error and a length of 0.1 mm in consideration of an additional margin.

The first antenna pattern 751 may be divided into a plurality of areas 751*a*, 751*b*, 751*c* and 751*d*. For example, one end of the first area 751*a* may be electrically connected to one end of the fifth conductive pad 745. The other end of the first area 751*a* may be extended toward the PCB side surface 311. The second area 751*b* may be extended from the other end of the first area 751*a* in parallel to the PCB side surface 311 in a lateral direction of the first area 751*a*. The second area 751*b* may be electrically connected to one end of the first branch line 761. The third area 751*c* may be extended from the other end of the second area 751*b* away from the PCB side surface 311 in a lateral direction of the second area 751*b*. The fourth area 751*d* may be extended from the other end of the third area 751*c* in parallel to the PCB side surface 311 in a lateral direction of the third area 751*c*.

The first switch 771 may be disposed on a PCB 270. The first switch 771 may be electrically connected to the fifth PCB line 725. For example, a first end and a second end of the first switch 771 may be electrically connected to the fifth PCB line 725. The first end of the first switch 771 may be electrically connected to the other end of the fifth conductive pad 745 through the fifth PCB line 725. A third end of the first switch 771 may be electrically connected to one end of the first antenna matching circuit 781 through a first RF line (or via hole) 791.

The main PCB 270 of the electronic device 200 according to various embodiments may have a structure in which a plurality of conductive pads 741 to 746 are omitted. For example, one end of the first antenna pattern 751 may be electrically connected to the first RF switch 771 through the fifth PCB line 725.

The main PCB 270 of the electronic device 200 according to various embodiments may include a plurality of layers. For example, a disposition structure of the main PCB 270 including a plurality of layers, the plurality of PCB lines 721 to 726, and the first branch line 761 may be the same as or similar to that illustrated in FIG. 8.

Figure 8:
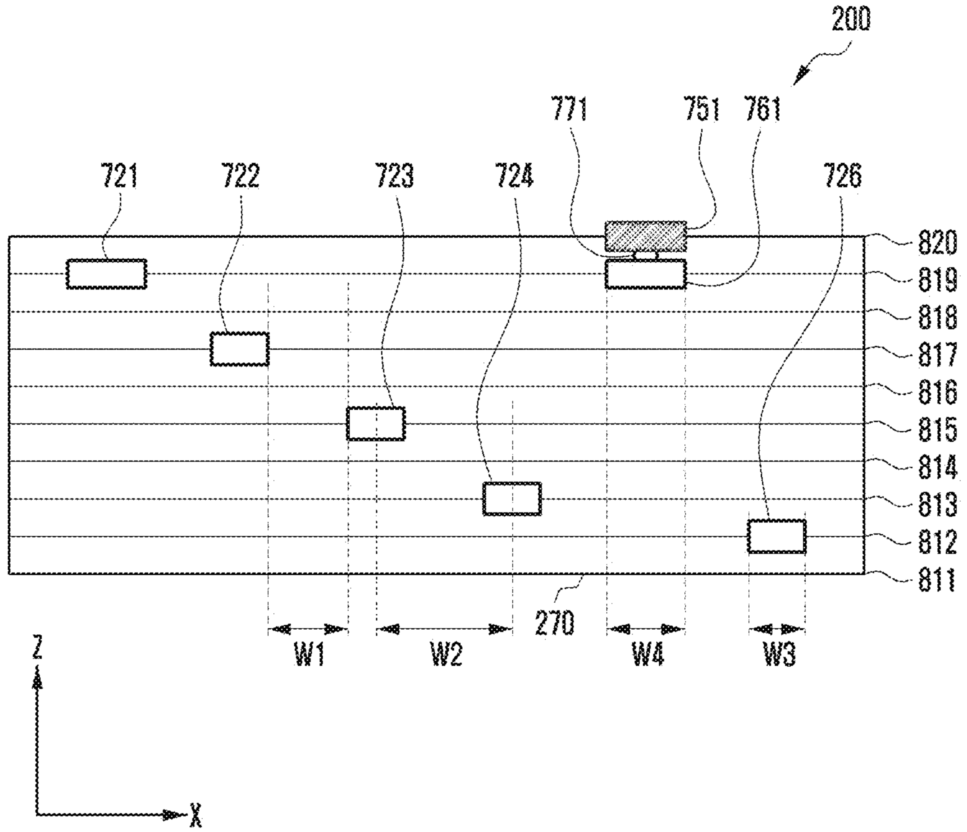
FIG. 8 is a cross-sectional view of a main PCB of an electronic device according to various embodiments.

FIG. 8 is a cross-sectional view of a main PCB of an electronic device according to various embodiments.

With reference to FIG. 8, the main PCB 270 of the electronic device 200 may include a plurality of layers 811, 812, 813, 814, 815, 816, 817, 818, 819 and 820 (which may be referred to herein as layers 811 to 820). The plurality of layers 811 to 820 may be include a conductive material and an insulating material. For example, the plurality of layers 811 to 820 may include conductive layers and insulating layers. For example, each of the plurality of layers 811 to 820 may be a conductive layer. An insulating layer may be formed between the plurality of layers 811 to 820. For example, the plurality of layers 811 to 820 may be prepregs. For example, the conductive layer may comprise a copper (Cu) layer. The insulating layer may comprise a polyimide (PI) layer. However, the disclosure is not limited to these specific materials and any other suitable materials may be used.

The main PCB 270 may include a plurality of PCB lines 721, 722, 723, 724 and 726, and a first branch line 761. According to an embodiment, the plurality of PCB lines may be lines positioned in the first area 310. For example, the sixth PCB line 726 may be disposed at the second layer 812 of the main PCB 270. The fourth PCB line 724 may be disposed at the third layer 813 of the main PCB 270. The third PCB line 723 may be disposed at the fifth layer 815 of the main PCB 270. The second PCB line 722 may be disposed at the seventh layer 817 of the main PCB 270. The first branch line 761 may be disposed at the ninth layer 819 of the main PCB 270.

According to an embodiment, the plurality of PCB lines may be lines positioned in the second area 320. For example, with reference to FIG. 8, although the first branch line 761 is illustrated, the disclosure is not limited thereto, and the first branch line 761 may correspond to the first RF line (or via hole) 791 or a fifth PCB line 725 positioned in the second area 320.

The first antenna pattern 751 may be disposed at the tenth layer 820 of the main PCB 270. A protective layer for protecting the main PCB 270 may be formed at an upper surface of the tenth layer 820. According to an embodiment, the protective layer may be removed from at least a partial area of the tenth layer 820. At least a portion of the first antenna pattern 751 may be exposed by removing the protective layer. The first antenna pattern 751 may be electrically connected to the first branch line 761 through the first via hole (or RF line) 791.

According to an embodiment, the fifth conductive pad 745 of FIG. 7 may be electrically connected to the first branch line 761 through the first via hole (or RF line) 791.

According to an embodiment, the first branch line 761 may be disposed at the tenth layer 820 of the main PCB 270. For example, one end of the first branch line 761 may be electrically connected to the first antenna pattern 751 to be disposed adjacent to the PCB side surface 311. One end of the first branch line 761 may be disposed at the ninth layer of the first branch line 761. For example, one end of the first branch line 761 may be disposed adjacent to the PCB side surface 311 through a separate path from the first antenna pattern 751.

A minimum length of a width w3 of each of the plurality of PCB lines 721 to 726 may be about 0.03 mm. A minimum length of a width w4 of the first branch lines 761 may be about 0.05 mm. Each of the plurality of PCB lines 721 to 726 may be spaced apart from each other by a predetermined (e.g., specified) distance w1 on the x-axis. For example, each of the plurality of PCB lines 721 to 726 may be spaced apart (w2) by about 1 mm from the center of the line.

A structure of the plurality of PCB lines 721 to 724 and 726 and the first branch line 761 described above is merely an embodiment among various example embodiments, and the disclosure is not limited thereto.

Figure 9:
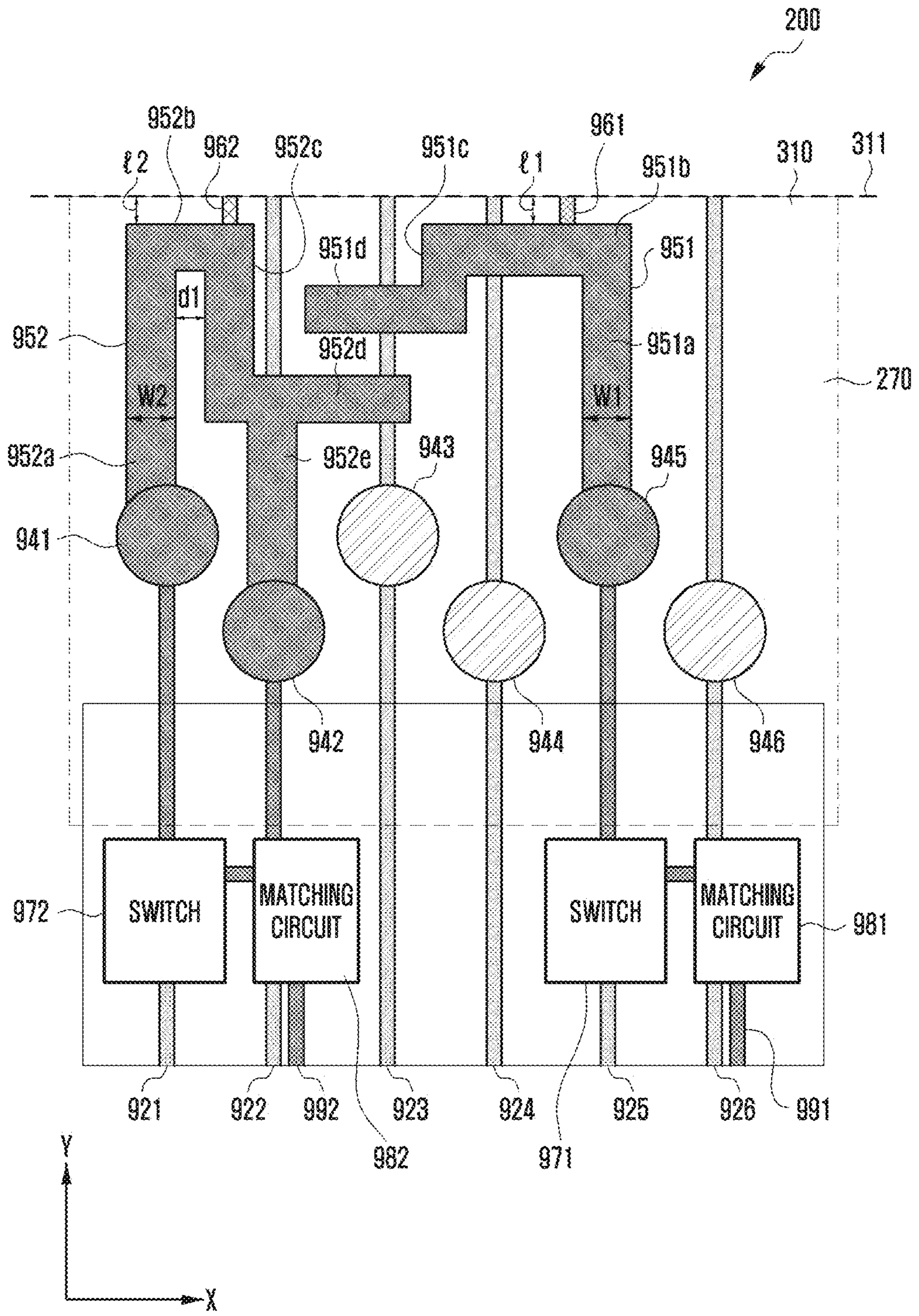
FIG. 9 is a diagram illustrating an upper surface of a main PCB of an electronic device according to various embodiments.

FIG. 9 is a diagram illustrating an upper surface of a main PCB of an electronic device according to various embodiments.

With reference to FIG. 9, the main PCB 270 of the electronic device 200 may include a plurality of PCB lines 921, 922, 923, 924, 925 and 926 (which may be referred to herein as lines 921 to 926), a plurality of conductive pads 941, 942, 943, 944, 945 and 946 (which may be referred to herein as pads 941 to 946), a first antenna pattern 951, a first branch line 961, a first switch 971, a first antenna matching circuit 981, a second antenna pattern 952, a second branch line 962, a second switch 972, and a second antenna matching circuit 982.

A disposition structure of the first antenna pattern 951, the first branch line 961, the first switch 971, and the first antenna matching circuit 981 may be the same as or similar to that of the first antenna pattern 751, the first branch line 761, the first switch 771, and the first antenna matching circuit 781 of FIG. 7.

The second antenna pattern 952 may be disposed on the main PCB 270. For example, the second antenna pattern 952 may be disposed at the upper surface of the main PCB 270. One end of the second antenna pattern 952 may be electrically connected to one end of the first conductive pad 941. The other end of the second antenna pattern 952 may be electrically connected to one end of the second conductive pad 942. A width w2 of the second antenna pattern 952 may be in a range of about 0.5 mm to 1.0 mm.

The second antenna pattern 952 may be electrically connected to the second branch line 962. For example, one end of the second branch line 962 may be electrically connected to an arbitrary point of the second antenna pattern 952. The arbitrary point may be a point having a low current distribution in the second antenna pattern 952 and having a low influence on antenna performance when the second antenna pattern 952 operates as an antenna. For example, in order to minimize and/or reduce a cutting deviation of the PCB side surface 311, the second branch line 962 may be designed to branch from a point at which a current distribution is lowest in the second antenna pattern 952 to a smallest line width. The second branch line 962 may be designed to minimize and/or reduce a fluctuation width of a resonant frequency of the twelfth antenna pattern 952.

A length 12 of the second branch line 962 may have various values. For example, the length 12 of the second branch line 962 may be about 0.2 mm. The length 12 of the first branch line 962 may be determined based on a length in consideration of a routing error and a length in consideration of an additional margin. For example, the length 12 of the second branch line 962 may be determined based on a length of 0.1 mm in consideration of a routing error and a length of 0.1 mm in consideration of an additional margin.

The second antenna pattern 952 may be divided into a plurality of areas 952*a*, 952*b*, 952*c*, 952*d* and 952*e*. For example, one end of the first area 952*a* may be electrically connected to one end of the first conductive pad 941. The other end of the first area 952*a* may be extended toward the PCB side surface 311 of the conductive pad area 310 of the main PCB 270. The second area 952*b* may be extended from the other end of the first area 951*a* in parallel to the side surface 311 of the PCB in a lateral direction of the first area 952*a*. The second area 952*b* may be electrically connected to one end of the second branch line 962. The third area 952*c* may be extended from the other end of the second area 952*b* away from the PCB side surface 311 in a lateral direction of the second area 952*b*. A separation distance dl between the third area 952*c* and the first area 952*a* may be about 0.5 mm or more.

The fourth area 952*d* may be extended from the other end of the third area 952*c* in parallel to the side surface 311 of the PCB in a lateral direction of the third area 952*c*. The fifth area 952*e* may be extended from one side surface of the fourth area 952*d* away from the side surface of the PCB 311.

The other end of the fifth area 952*e* may be electrically connected to one end of the second conductive pad 942.

The other end of the second conductive pad 942 may be grounded. The other end of the second conductive pad 942 may be electrically connected to the second PCB line 922. The second PCB line 922 may be grounded.

The second switch 972 may be disposed on the main PCB 270. The second switch 972 may be electrically connected to the first PCB line 921. For example, a first end and a second end of the second switch 972 may be electrically connected to the first PCB line 921. The first end of the second switch 972 may be electrically connected to the other end of the first conductive pad 941 through the first PCB line 921. A third end of the second switch 972 may be electrically connected to one end of the second antenna matching circuit 982 through a second line (or via hole) 992.

The main PCB 270 of the electronic device 200 according to various embodiments may include a plurality of layers. For example, a disposition structure of the main PCB 270 including the plurality of layers, the plurality of PCB lines 921 to 926, the first branch line 961, and the second branch line 962 may be the same as or similar to that illustrated in FIG. 10

Figure 10:
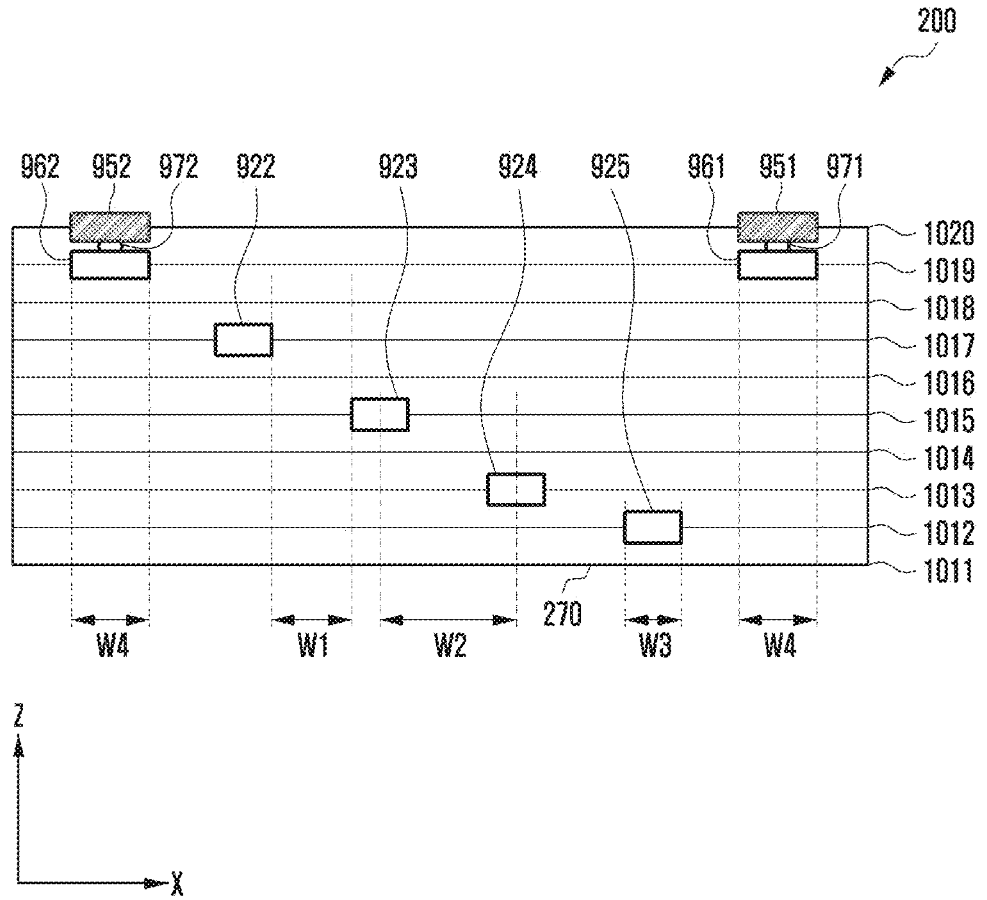
FIG. 10 is a cross-sectional view of a main PCB of an electronic device according to various embodiments.

FIG. 10 is cross-sectional view of a main PCB of an electronic device according to various embodiments.

With reference to FIG. 10, the main PCB 270 of the electronic device 200 may include a plurality of layers 1011, 1012, 1013, 1014, 1015, 1016, 1017, 1018, 1019 and 1020 (which may be referred to herein as layers 1011 to 1020). The plurality of layers 1011 to 1020 may comprise a conductive material and an insulating material. For example, a configuration of the plurality of layers 1011 to 1020 may be the same as or similar to that of the plurality of layers 811 to 820 of FIG. 8.

The main PCB 270 may include a plurality of PCB lines 922, 923, 924 and 926, and a plurality of branch lines 961 and 962. For example, the sixth PCB line 926 may be disposed at the second layer 1012 of the main PCB 270. The fourth PCB line 924 may be disposed at the third layer 1013 of the main PCB 270. The third PCB line 923 may be disposed at the fifth layer 1015 of the main PCB 270. The second PCB line 922 may be disposed at the seventh layer 1017 of the main PCB 270. The first branch line 961 and the second branch line 962 may be disposed at the ninth layer 1019 of the main PCB 270.

The first antenna pattern 951 and the second antenna pattern 952 may be disposed at the tenth layer 1020 of the main PCB 270. A protective layer for protecting the main PCB 270 may be formed at an upper surface of the tenth layer 1020. The protective layer may be removed from at least a partial area of the tenth layer 1020. At least a portion of a first antenna pattern 951 and a second antenna pattern 952 may be exposed by removing the protective layer. The first antenna pattern 951 may be electrically connected to the first branch line 961 through the first via hole 991. The second antenna pattern 952 may be electrically connected to the second branch line 962 through the second via hole (or line) 992.

According to an embodiment, the plurality of PCB lines may be lines positioned in the second area 320. For example, with reference to FIG. 10, although the first branch line 961 is illustrated, the disclosure is not limited thereto, and the first branch line 961 may correspond to a first RF line 991 or a fifth PCB line 925 positioned at the second area 320. For example, with reference to FIG. 10, although the second branch line 962 is illustrated, the disclosure is not limited thereto, and the second branch line 962 may correspond to the second RF line (or via hole) 992 or the first PCB line 921 positioned at the second area 320.

According to an embodiment, the fifth conductive pad 945 of FIG. 9 may be electrically connected to the first branch line 961 through the first via hole 991. According to an embodiment, the first conductive pad 941 of FIG. 9 may be electrically connected to the second branch line 962 through the second via hole (or line) 992.

According to an embodiment, the first branch line 761 or the second branch line 762 may be disposed at the tenth layer 820 of the main PCB 270. For example, one end of the first branch line 761 or the second branch line 762 may be electrically connected to the antenna patterns 951 and 952 to be disposed adjacent to the PCB side surface 311.

A minimum length of a width w3 of each of the plurality of PCB lines 921 to 926 may be about 0.03 mm. A minimum length of a width w4 of each of the plurality of branch lines 961 and 962 may be about 0.05 mm. Each of the plurality of PCB lines 921 to 926 may be spaced apart from each other by a predetermined distance w1 on the x-axis. For example, each of the plurality of PCB lines 921 to 926 may be spaced apart (w2) by about 1.0 mm from the center of the line.

A structure of the plurality of PCB lines 921 to 924 and 926 and the first branch line 961 described above is merely an example of various embodiments, and the disclosure is not limited thereto.

Figure 11:
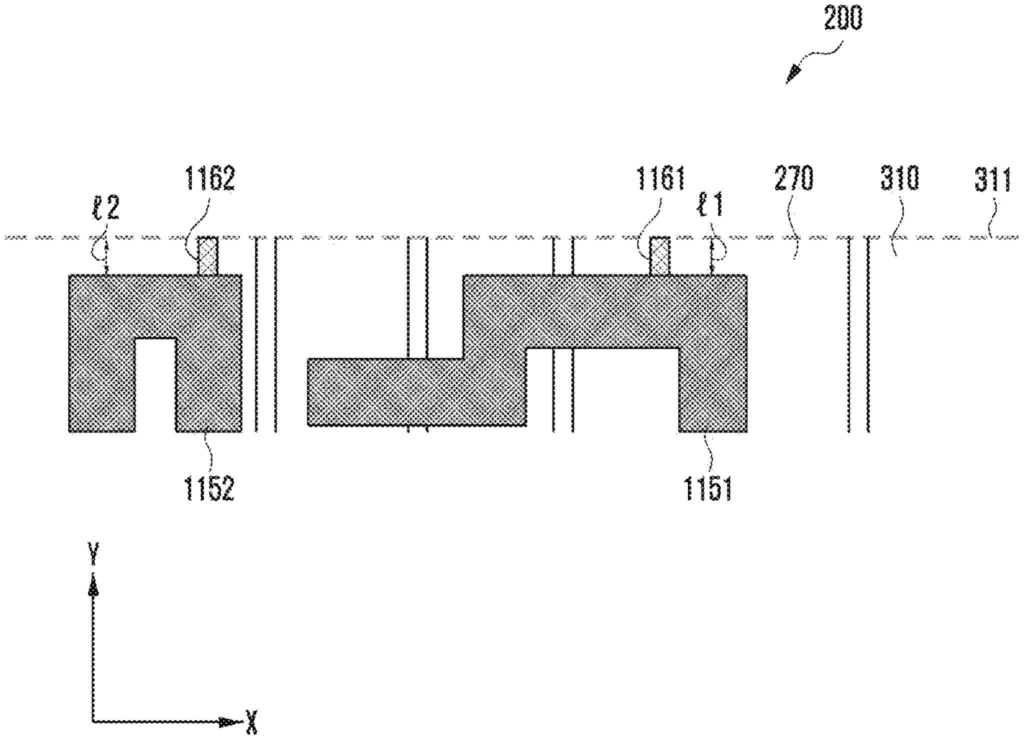
FIG. 11 is a diagram illustrating an upper surface of a first area of a main PCB of an electronic device according to various embodiments.

FIG. 11 is a diagram illustrating an upper surface of a conductive pad area of a main PCB of an electronic device according to various embodiments.

With reference to FIG. 11, a length 11 of a first branch line 1161 electrically connected to a first antenna pattern 1151 of the main PCB 270 of the electronic device 200 may be various. For example, the length 11 of the first branch line 1161 may be in a range of about 0.1 mm to 0.2 mm. The length of the first branch line 1161 may exceed 0.2 mm.

A length 12 of a second branch line 1162 electrically connected to a second antenna pattern 1152 may be various. For example, the length 12 of the second branch line 1162 may be in a range of about 0.1 mm to 0.2 mm. The length of the second branch line 1162 may exceed 0.2 mm.

Figure 12:
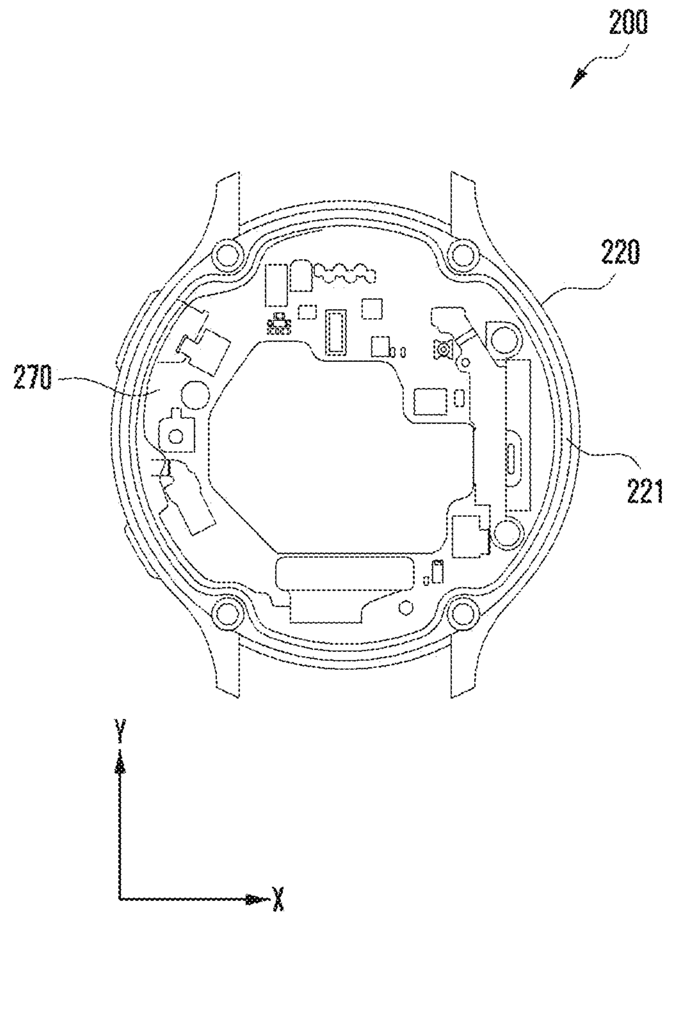
FIG. 12 is a diagram illustrating a rear surface of an electronic device in which a rear case is removed according to various embodiments.

FIG. 12 is a diagram illustrating a rear surface of an electronic device in which a rear case is removed according to various embodiments.

With reference to FIG. 12, the electronic device 200 may include a front case 220 and a main PCB 270. A rear waterproof rubber ring 221 may be disposed along an edge of the main PCB 270. In order to avoid interference with the front case 220, the main PCB 270 may be spaced apart from the front case 220 by a predetermined (e.g., specified) distance. For example, a cross-section of the electronic device 200 based on the z-axis may be as illustrated in FIG. 13.

Figure 13:
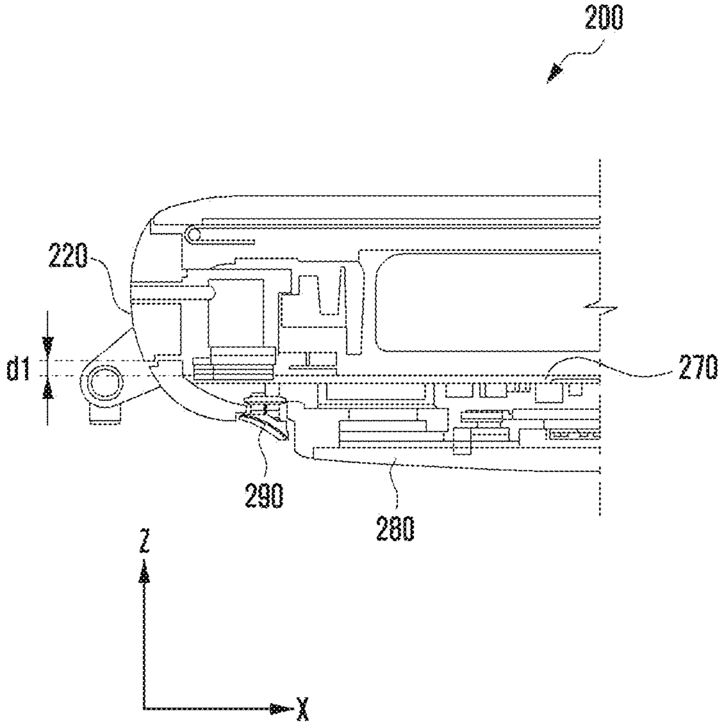
FIG. 13 is a partial cross-sectional view of an electronic device taken on a z-axis according to various embodiments.

FIG. 13 is a partial cross-sectional view of an electronic device taken on a z-axis according to various embodiments.

With reference to FIG. 13, the electronic device 200 may include a front case 220, a main PCB 270, a rear case 280, and a waterproof stopper 290. For example, the main PCB 270 may be disposed inside the rear case 280 while being spaced apart dl from the front case 220 by a predetermined (e.g., specified) distance in the z-axis.

The waterproof stopper 290 according to various embodiments may be coupled to the rear case 280. FIG. 13 illustrates a shape in which the waterproof stopper 290 is coupled to the rear case 280, but the disclosure is not limited thereto. The waterproof stopper 290 according to various embodiments may be coupled to one side surface of the front case 220.

Figure 14:
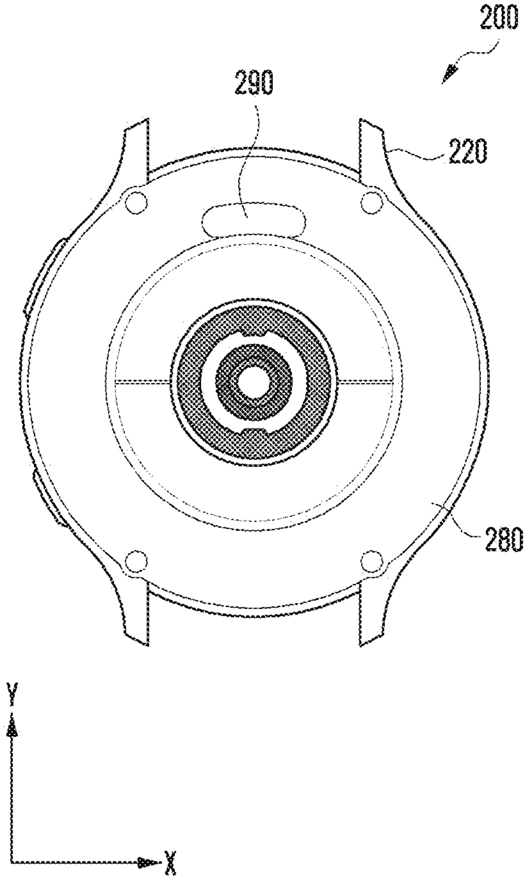
FIG. 14 is a diagram illustrating a rear surface of an electronic device including a waterproof stopper according to various embodiments.

FIG. 14 is a diagram illustrating a rear surface of an electronic device including a waterproof stopper according to various embodiments.

With reference to FIG. 14, the electronic device 200 may include a front case 220, a rear case 280, and a waterproof stopper 290. The rear case 280 may be coupled to the front case 220. The waterproof stopper 290 may be coupled to the rear case 280. For example, the rear case 280 may include a coupling part 281 (refer to FIG. 15) capable of being coupled to the waterproof stopper 290. The waterproof stopper 290 may be coupled to the rear case 280 through the coupling part 281. A rear surface of the rear case 280 in which the waterproof stopper 290 is removed may be illustrated, as shown in FIG. 15.

Figure 15:
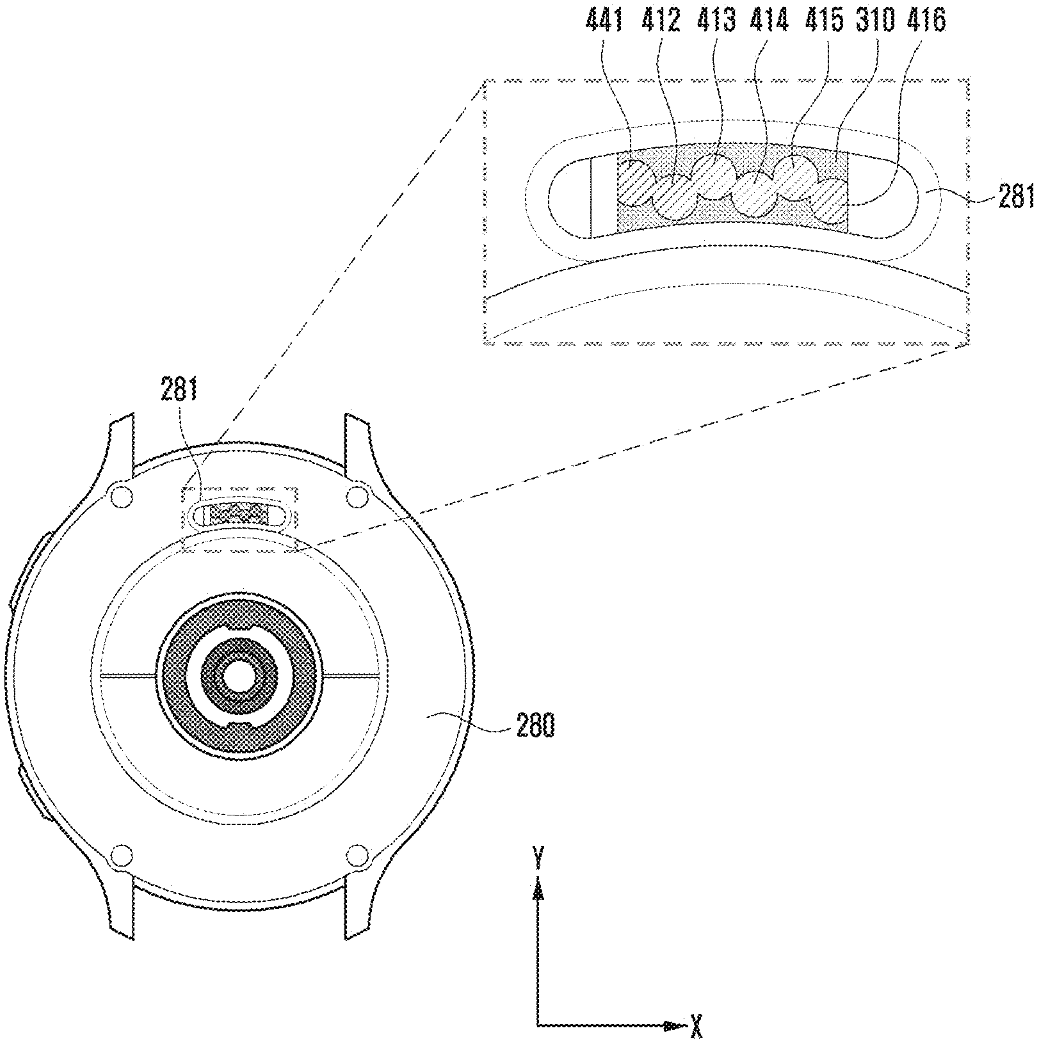
FIG. 15 is a diagram illustrating a rear surface of an electronic device in which a waterproof stopper is removed according to various embodiments.

FIG. 15 is a diagram illustrating a rear surface of an electronic device in which a waterproof stopper is removed according to various embodiments.

With reference to FIG. 15, the waterproof stopper 290 may be removed from the coupling part 281 of the rear case 280. The coupling part 281 may have a hole shape penetrating upper and lower surfaces of a portion of the rear case 280. For example, the conductive pads 411 to 416 of the conductive pad area 310 may be exposed through the coupling part 281 in which the waterproof stopper 290 is removed.

The electronic device 200 may be tested through the conductive pads 411 to 416 of the exposed conductive pad area 310. For example, a test equipment (not illustrated) may be electrically connected to at least one of the RF lines 530 and 560 and the PCB line 530 of FIG. 5 through conductive pads 411 to 416. The test equipment (not illustrated) may perform a test on the electronic device 200 through at least one of the RF lines 530 and 560 and the PCB lines 530.

The waterproof stopper 290 may be illustrated and described in greater detail below with reference to FIGS. 16 and 17.

Figure 16:
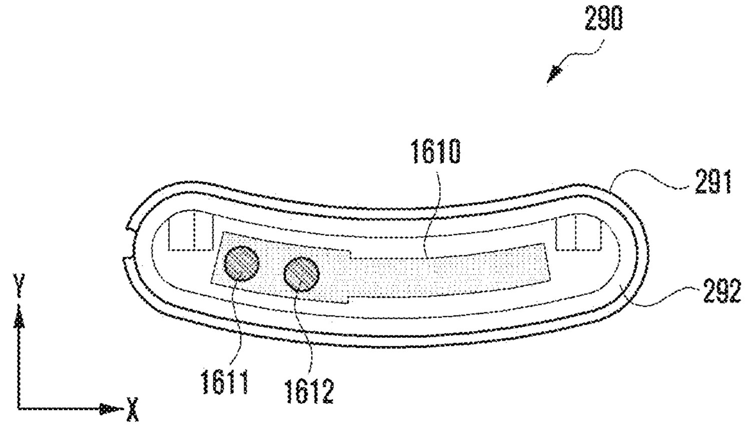
FIG. 16 is a diagram illustrating an upper surface and a side surface of a waterproof stopper including a third antenna pattern and a connector of an electronic device according to various embodiments.
Figure 16:
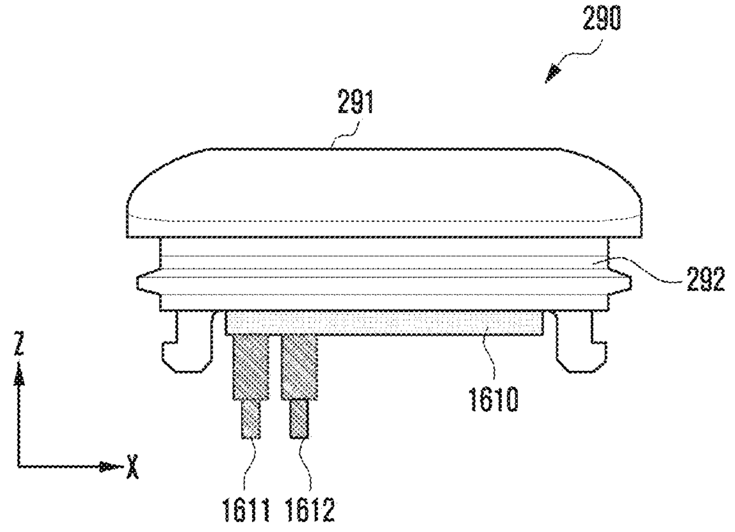

FIG. 16 is a diagram illustrating an upper and side surface of a waterproof stopper including a third antenna pattern and a connector of an electronic device according to various embodiments.

With reference to FIG. 16, the waterproof stopper 290 may include a waterproof rubber ring 292, a third antenna pattern 1610, and a plurality of connectors 1611 and 1612. For example, the waterproof rubber ring 292 may enclose a partial area of a waterproof stopper body 291. For example, the third antenna pattern 1610 may be disposed at the upper surface of the waterproof stopper 290. The plurality of connectors 1611 and 1612 may be disposed at one surface of the third antenna pattern 1610. The plurality of connectors 1611 and 1612 may be electrically connected to the third antenna pattern 1610.

Figure 17:
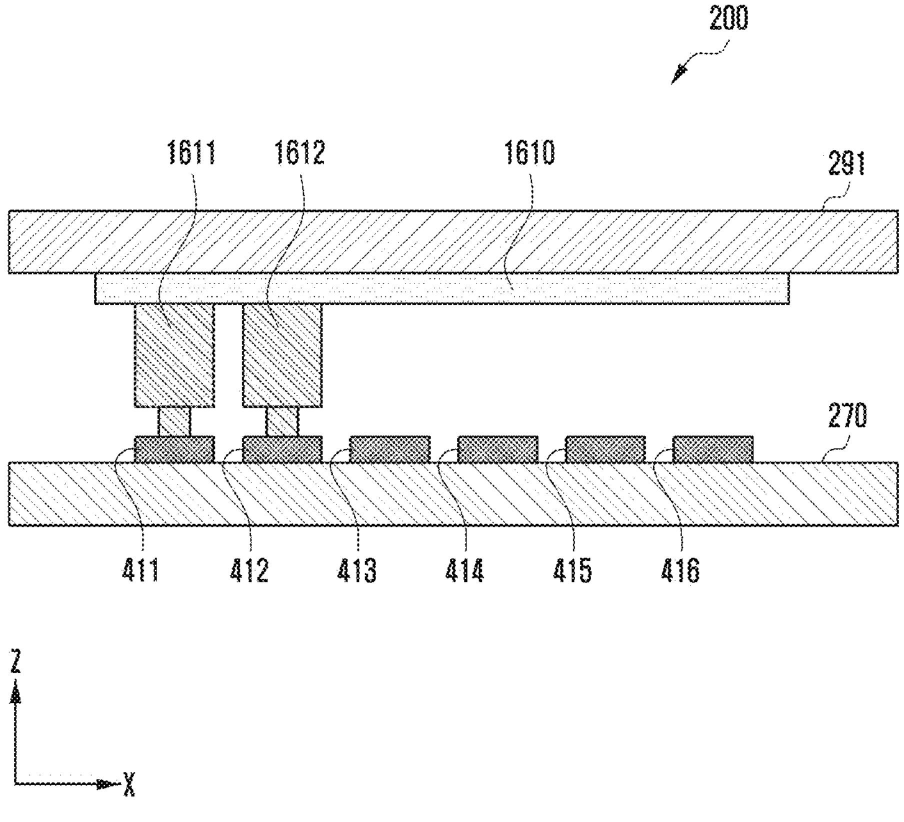
FIG. 17 is a cross-sectional view of a waterproof stopper and a conductive pad of a main PCB of an electronic device taken on a z-axis according to various embodiments.

FIG. 17 is a cross-sectional view of a waterproof stopper and a conductive pad of a main PCB of an electronic device taken on a z-axis according to various embodiments.

With reference to FIG. 17, the plurality of connectors 1611 and 1612 of the waterproof stopper 290 of the electronic device 200 may be electrically connected to some of the conductive pads 411 to 416 of the main PCB 270. For example, the first connector 1611 may be electrically connected to the first conductive pad 411. The second connector 1612 may be electrically connected to the second conductive pad 412. The third antenna pattern 1610 may be electrically connected to the first conductive pad 411 and the second conductive pad 412 through the plurality of connectors 1611 and 1612.

For example, the third antenna pattern 1610 may be electrically connected to the antenna pattern 510 of FIG. 5. For example, the third antenna pattern 1610 may be electrically connected to the antenna pattern 510 of the main PCB 270 to operate as an antenna having a three-dimensional structure. The third antenna pattern 1610 may be electrically connected to the antenna pattern 510 of the main PCB 270 to operate as a planer inverted f antenna (PIFA)/inverted f antenna (IFA) antenna. For example, the third antenna pattern 1610 may radiate a signal received from the first conductive pad 411 through the first connector 1611. The second connector 1611 may be shorted through the second conductive pad 412. The second conductive pad 412 may be grounded. For example, the third antenna pattern 1610 may be electrically connected to the second antenna pattern 952 of FIG. 9.

Figure 18:
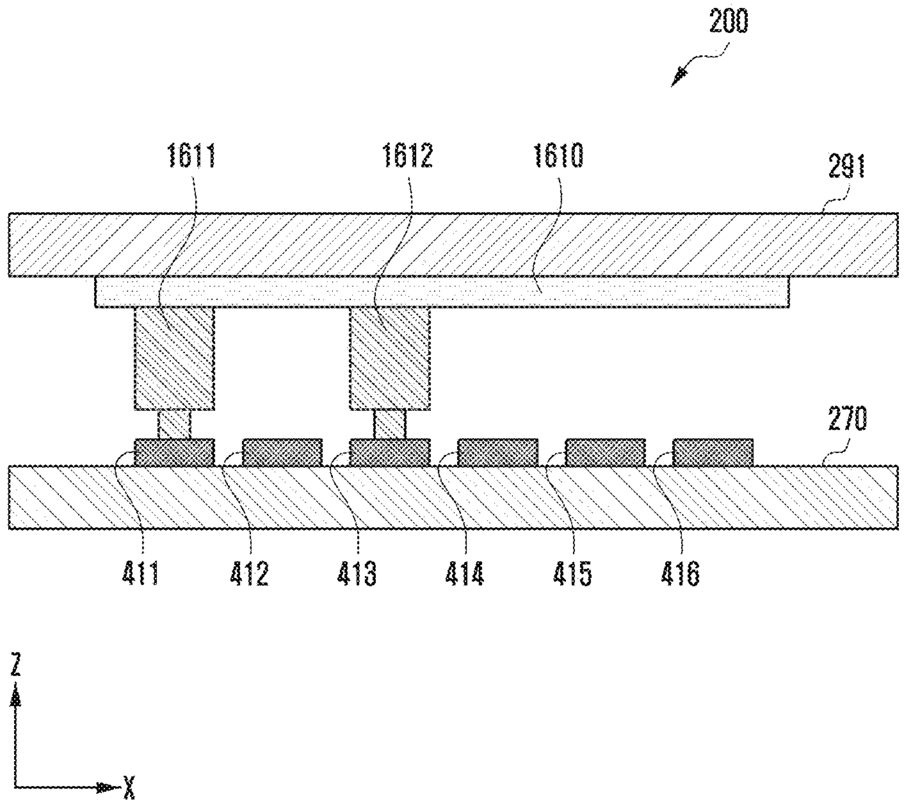
FIG. 18 is a cross-sectional view of a waterproof stopper and a conductive pad of a main PCB taken on a z-axis according to various embodiments.

FIG. 18 is a cross-sectional view of a waterproof stopper and a conductive pad of a main PCB taken on a z-axis according to various embodiments.

With reference to FIG. 18, the first connector 1611 may be electrically connected to the first conductive pad 411. The second connector 1612 may be electrically connected to the third conductive pad 413. The third antenna pattern 1610 may be electrically connected to the first conductive pad 411 and the third conductive pad 413 through the plurality of connectors 1611 and 1612.

For example, the third antenna pattern 1610 may be electrically connected to the second antenna pattern 952 of FIG. 9. For example, the third antenna pattern 1610 may be electrically connected to the second antenna pattern 952 of FIG. 9 to operate as an antenna having a three-dimensional structure. For example, the third antenna pattern 1610 may radiate a signal received from the first conductive pad 411 through the first connector 1611. The second conductive pad 412 may be shorted. The third conductive pad 413 may be grounded.

Figure 19:
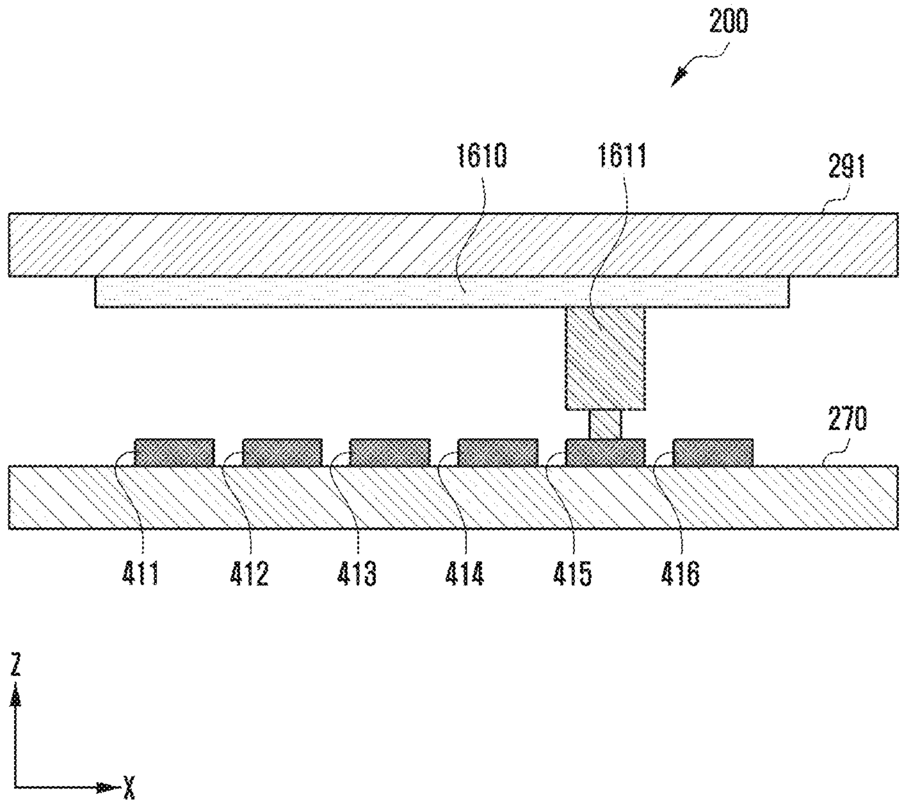
FIG. 19 is a cross-sectional view of a waterproof stopper and a conductive pad of a main PCB taken on a z-axis according to various embodiments.

FIG. 19 is a cross-sectional view of a waterproof stopper and a conductive pad of a main PCB taken on a z-axis according to various embodiments.

With reference to FIG. 19, the first connector 1611 of the waterproof stopper 290 of the electronic device 200 may be electrically connected to the fifth conductive pad 415 of the main PCB 270. The third antenna pattern 1610 may be electrically connected to the fifth conductive pad 415 through the first connector 1611.

The third antenna pattern 1610 may be electrically connected to the first antenna pattern 751 of FIG. 7. For example, the third antenna pattern 1610 may be electrically connected to the first antenna pattern 751 to operate as an antenna having a three-dimensional structure. The third antenna pattern 1610 may be electrically connected to the first antenna pattern 751 to operate as a monopole antenna. For example, the third antenna pattern 1610 may radiate a signal received from the fifth conductive pad 415 through the first connector 1611.

The electronic device 200 according to various embodiments may operate in various frequency bands. For example, the electronic device 200 may operate in a frequency band of about 2.4 GHz to 5 GHz and a frequency band of about 6 GHz to 9 GHz.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a printed circuit board (PCB);

a plurality of lines disposed on the PCB;

a plurality of conductive pads disposed at an upper surface of the PCB on which the plurality of lines are disposed;

a first antenna pattern disposed at the upper surface of the PCB and electrically connected to a first conductive pad of the plurality of conductive pads;

a first switch electrically connected to the first antenna pattern; and a first antenna matching circuit, wherein a first end of the first switch is electrically connected to the first antenna pattern, and wherein a second end of the first switch is electrically connected to the first antenna matching circuit.

2. The electronic device of claim 1, wherein one end of the first antenna pattern is electrically connected to one end of the first conductive pad, the second end of the first switch is electrically connected to another end of the first conductive pad, and third end of the first switch is electrically connected to a first line of the plurality of lines.

3. The electronic device of claim 1, wherein the first antenna pattern comprises a first branch line, and the first branch line is branched from a point of one surface of the first antenna pattern extending toward one side surface of the PCB.

4. The electronic device of claim 1, further comprising:

a second antenna pattern disposed at the upper surface of the PCB and electrically connected to a second conductive pad and a third conductive pad of the plurality of conductive pads; and a second switch electrically connected to the second antenna pattern.

5. The electronic device of claim 4, wherein a first end of the second antenna pattern is electrically connected to one end of the second conductive pad, a first end of the second switch is electrically connected to another end of the second conductive pad, and a second end of the second switch is electrically connected to a second line of the plurality of lines.

6. The electronic device of claim 4, further comprising a second antenna matching circuit, wherein a third end of the second switch is electrically connected to the second antenna matching circuit.

7. The electronic device of claim 4, wherein the second antenna pattern comprises a second branch line, and the second branch line is branched from a point of one surface of the second antenna pattern extending toward one side surface of the PCB.

8. The electronic device of claim 4, wherein a third end of the second switch is electrically connected to a third line of the plurality of lines.

9. The electronic device of claim 1, further comprising:

a metal front case; and a rear case coupled to the metal front case; and a waterproof stopper coupling part, and a waterproof stopper coupled to the waterproof stopper coupling part.

10. The electronic device of claim 9, wherein the PCB is disposed at the rear case to be spaced apart from the front case by a specified distance.

11. The electronic device of claim 9, wherein the waterproof stopper is coupled to the rear case.

12. The electronic device of claim 9, wherein the waterproof stopper is coupled to the front case.

13. The electronic device of claim 9, wherein the waterproof stopper comprises a third antenna pattern disposed at an upper surface thereof, and the third antenna pattern comprises a first connector and a second connector disposed at one surface thereof.

14. The electronic device of claim 13, wherein the first connector is electrically connected to the second conductive pad, and the second connector is electrically connected to the third conductive pad.

15. An electronic device, comprising:

a front case;

a rear case coupled to the front case; and a waterproof stopper coupling part, and a waterproof stopper coupled to the waterproof stopper coupling part, wherein the waterproof stopper comprises a first antenna pattern disposed at a lower surface thereof.

16. The electronic device of claim 15, wherein the first antenna pattern comprises a first connector disposed at one surface thereof.

17. The electronic device of claim 16, further comprising:

a printed circuit board (PCB) disposed at the rear case to be spaced apart from the front case by a specified distance;

a plurality of lines disposed at the PCB; and a first switch electrically connected to a first line of the plurality of lines, wherein the first connector is electrically connected to the first line.

18. The electronic device of claim 17, further comprising a plurality of conductive pads disposed at an upper surface of the PCB in which the plurality of lines are disposed.

19. The electronic device of claim 18, wherein the first connector is electrically connected to the first line through the first conductive pad.

* * * * *